US006226361B1

United States Patent
Koyama

(10) Patent No.: US 6,226,361 B1
(45) Date of Patent: May 1, 2001

(54) COMMUNICATION METHOD, VOICE TRANSMISSION APPARATUS AND VOICE RECEPTION APPARATUS

(75) Inventor: Akira Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/058,782

(22) Filed: Apr. 13, 1998

(30) Foreign Application Priority Data

Apr. 11, 1997 (JP) .................................................. 9-093448

(51) Int. Cl.[7] ............................... H04M 1/64; G10L 5/00
(52) U.S. Cl. ..................... 379/88.07; 379/88.13; 379/88.16; 379/88.17; 379/900; 704/260; 704/270
(58) Field of Search .............................. 379/67.1, 88.01, 379/88.02, 88.07, 88.16, 88.17; 704/258, 260, 264, 268, 270, 272, 278; 348/14, 15, 16; 370/356, 394, 473

(56) References Cited

U.S. PATENT DOCUMENTS

| 5,163,081 | * | 11/1992 | Wycherley et al. | 379/52 |
| 5,500,919 | * | 3/1996 | Luther | 395/2.69 |
| 5,742,905 | * | 4/1998 | Pepe et al. | 455/461 |
| 5,790,180 | * | 8/1998 | Wild | 348/16 |
| 5,864,814 | * | 1/1999 | Yamazaki | 704/268 |
| 5,884,262 | * | 3/1999 | Wise et al. | 704/270 |
| 5,905,476 | * | 5/1999 | McLaughlin et al. | 345/1 |

FOREIGN PATENT DOCUMENTS

| 60-136450 | 7/1985 | (JP) . |
| 61-71730 | 4/1986 | (JP) . |
| 61-256848 | 11/1986 | (JP) . |
| 63-105557 | 5/1988 | (JP) . |
| 63-138850 | 6/1988 | (JP) . |
| 2-19057 | 1/1990 | (JP) . |
| 2-20148 | 1/1990 | (JP) . |
| 2-100441 | 4/1990 | (JP) . |
| 4-10734 | 1/1992 | (JP) . |
| 6-276220 | 9/1994 | (JP) . |

* cited by examiner

Primary Examiner—Fan Tsang
Assistant Examiner—Allan Hoosain
(74) Attorney, Agent, or Firm—Sughrue, Mion, Zinn, Macpeak & Seas, PLLC

(57) ABSTRACT

The invention provided a a communication method, a voice transmission apparatus and a voice reception apparatus by which, in communication through a non-guarantee type network, deterioration in voice, unnatural interruption of language, jump of voice and so forth which arise from unstable communication or a load variation can be eliminated to the utmost to allow conversation which can be recognized readily and conversation by natural voice can be achieved. Voice of a talking person is inputted through a voice to electric conversion element such as a microphone to a voice inputting and outputting element, by which the voice signal is converted into a corresponding voice data electric signal. The voice data are inputted to a speech recognition and conversion section, by which they are converted into a character code data signal by speech synthesis.

10 Claims, 9 Drawing Sheets

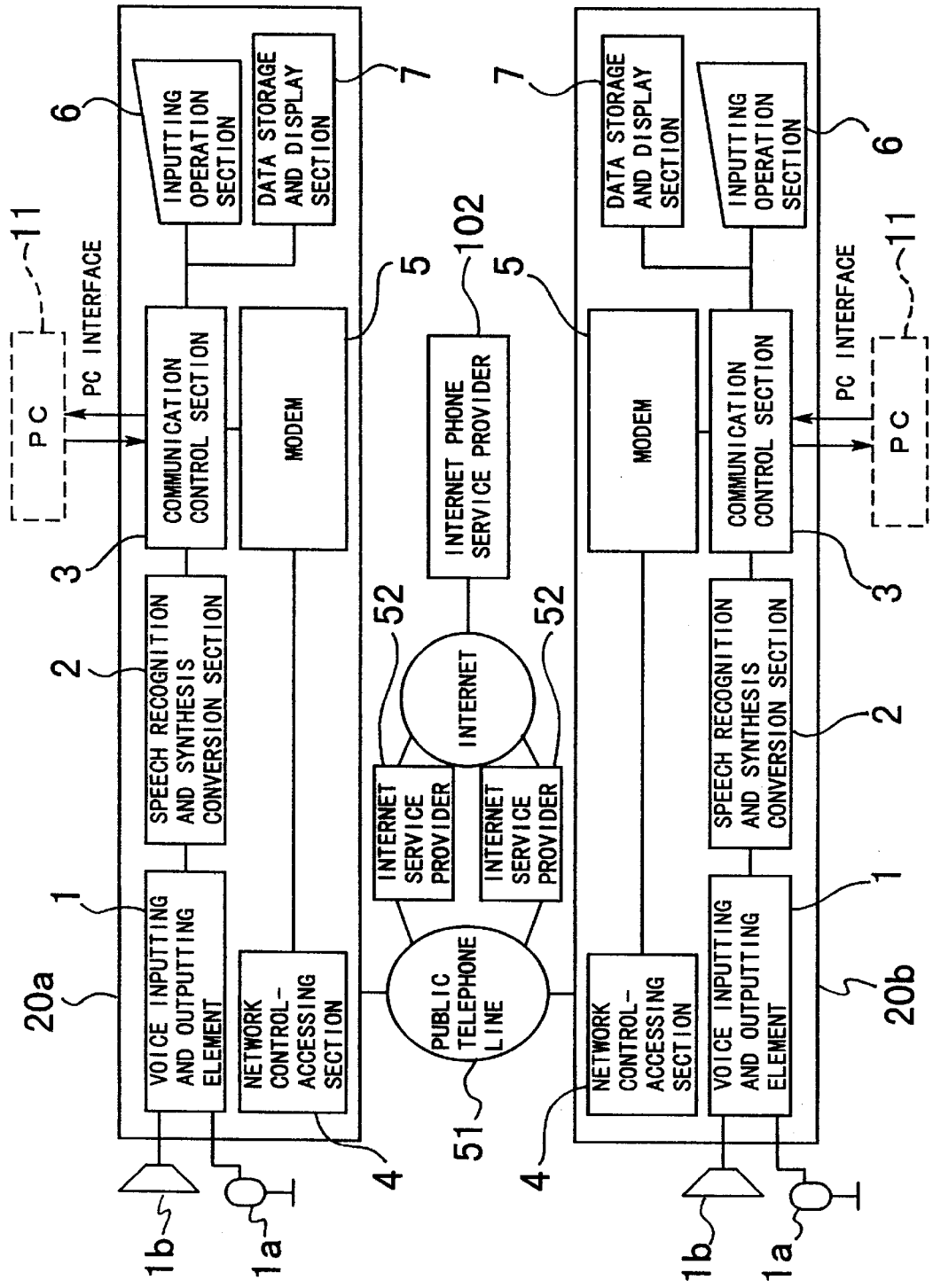

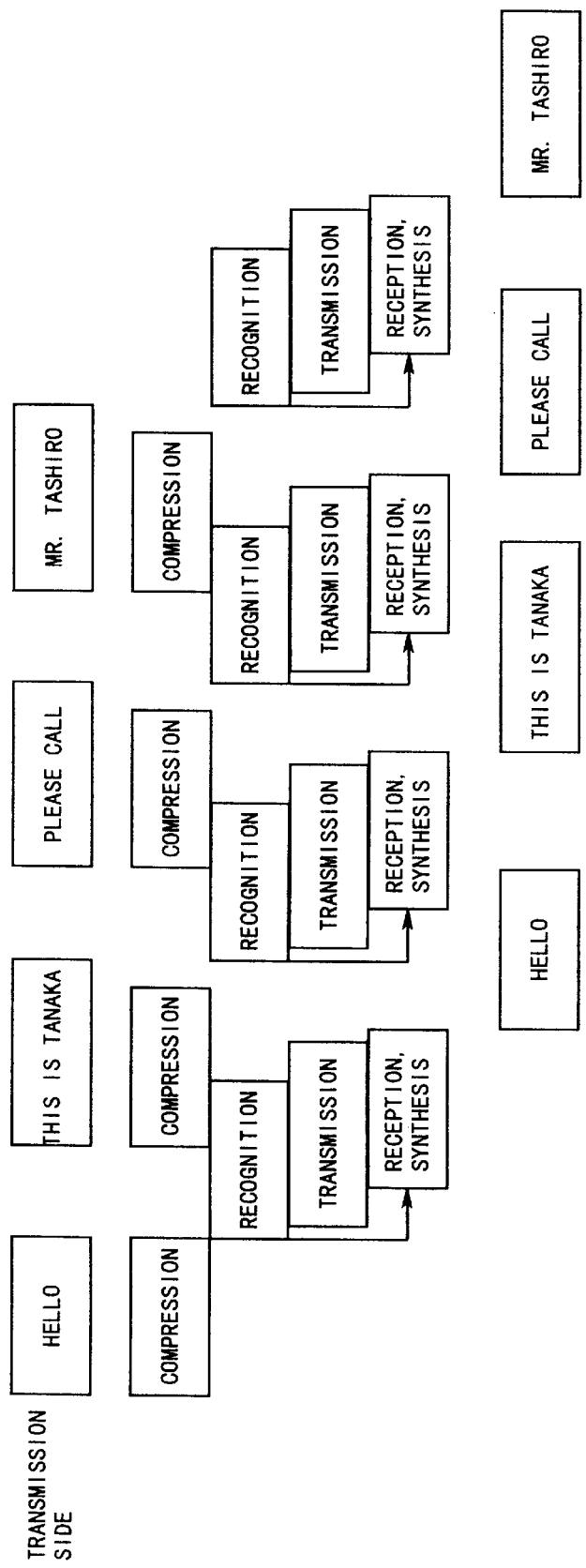

COMMUNICATION METHOD, VOICE TRANSMISSION APPARATUS AND VOICE RECEPTION APPARATUS

BACKGROUND OF THE INVENTION

1. Field of the Invention

This invention relates to a communication method, a voice transmission apparatus and a voice reception apparatus for use for communication through a non-guarantee type network such as an internet.

2. Description of the Related Art

As popularization of an internet proceeds, a technique has been proposed wherein voice is transmitted reciprocally through internet networks to effect bidirectional communication similarly as in a public telephone network. Such a technique of the type just described is called internet phone service.

The internet phone service at present is influenced, because of intervention of a number of networks each including a computer and a router, by a delay by a load of a server at each node such that it suffers from a delay, unnatural interruption of language, jump of voice and so forth, and it is usually the case that complete communication cannot be achieved. This arises from the fact that the internet is a non-guarantee type network (also called best effort type network) which does not guarantee time and arrival of information.

In order to solve the problem just described, a real time protocol and a reserve protocol which assures a line have been proposed. However, they still fail to guarantee complete communication between parties because a network is used commonly basically by a large number of communicating parties.

While the transmission capacity of the internet itself naturally takes part in a cause of the problem described above, also the compression capacity of voice data takes part in it. In compression of voice data, if the compression ratio is raised, then the voice quality is deteriorated, but if the compression ratio is suppressed low, then although the voice quality is raised, since an increased band width of the transmission line is consumed, a delay is produced and skipping, jumping or blank of voice occurs. In either case, a desired voice quality cannot be obtained.

One of techniques for sending much voice information in a narrow band is to convert inputted voice of a talking person into character data by a speech recognition technique and transmit the character data to the reception side. Since the information amount of character data is much smaller than that of voice information, the communication delay can be reduced, and besides, any problem involved in speech recognition does not occur. A technique of the type described is disclosed, for example, in Japanese Patent Laid-Open Application No. Heisei 60-136450 or Japanese Patent Laid-Open Application No. Heisei 61-256848.

The former document discloses a system wherein input voice is recognized first and then converted into data in the form of a packet of a packet exchange and the data are communicated between terminals of the packet exchange, and proposes the system as a countermeasure to improve the processing efficiency of the exchange. In the system disclosed, since it involves communication in the single packet exchange network, no countermeasure is taken against a long delay or a load variation which occurs in internet networks wherein communication is performed through a large number of unknown nodes. Further, as recited in the document, it is difficult to apply the system to flexible and wide range information transmission in that reproduction is performed only with a uniform tone and no attention is paid to natural voice.

The latter document discloses another system wherein speech recognition is performed to obtain character codes by an originating terminal and the character codes are sent through an exchange to a terminating terminal and then speech synthesis is performed based on the character codes by the terminating terminal. Since also the system involves communication in a single communication network, similarly to the system of the former document, no countermeasure is taken against a long delay or a load variation which occurs in internet networks wherein communication is performed through a large number of unknown nodes. Also, no countermeasure is taken for real time conversion or conversion into natural voice.

Accordingly, the systems described above have the following subjects to be solved.

The first subject resides in that conversation which allows recognition of significance is disturbed by deterioration of voice, unnatural interruption of language, jump of voice or the like which arises from the transmission capacity of internet networks themselves or unstable communication or a load variation because of intervention of an unknown communication path such as servers provided in multiple stages.

The second subject resides in that, also in a voice transmission system which employs speech recognition, where only transmission using character codes is involved, since mechanical voice is reproduced, natural conversation cannot be achieved and there is the possibility that such a problem as misunderstanding may possibly occur.

SUMMARY OF THE INVENTION

It is an object of the present invention to provide a communication method, a voice transmission apparatus and a voice reception apparatus by which, in communication through a non-guarantee type network, deterioration in voice, unnatural interruption of language, jump of voice and so forth which arise from unstable communication or a load variation can be eliminated to the utmost to allow conversation which can be recognized readily and conversation by natural voice can be achieved.

In order to attain the object described above, according to an aspect of the present invention, there is provided a communication method for communicating voice of a talking person through a non-guarantee type network, comprising the steps of converting, by a call originating side terminal, voice of a talking person into electric voice data and speech recognizing the voice data to covert the voice data into character data, connecting the call originating side terminal to a call terminating side terminal through the non-guarantee type network based on identification data of the call terminating side terminal, transmitting, after the connection between the call originating side terminal and the call terminating side terminal is established, the character data as packets toward the call terminating side terminal, and receiving the packet character data by the call terminating side terminal, converting the received character data in the form of packets into voice data by speech synthesis and outputting the voice data as voice.

With the communication method, the following advantages can be achieved. First, the amount of data by recognition can be reduced to eliminate a delay in communication. Since significance is interpreted for each phrase or group of words of talked language to convert the talked language into character data of a form which exhibits a significantly reduced amount of data, a delay in communication can be reduced remarkably. Consequently, correct information can be obtained at a comparatively early timing.

Further, significance information by recognition can be transmitted with certainty to the other party. Since talked language is recognized and converted into character information of phrases, the information can be reproduced not as voice which is ambiguous information which is liable to be influenced by noise but as language having clear significance, and consequently, a will of the talking person can be conveyed correctly.

In this instance, in order to convey correct information to the other party of communication, an accurate sentence must be communicated even if some delay is involved. In a conventional method, since talked language is encoded without relying upon contents or significance of language, if some delay or interruption occurs in or with communication, there is the possibility that the significance cannot be conveyed at all. Therefore, as a countermeasure to transmit voice with a higher degree of clarity and certainty, the following features may be adopted.

In particular, in the communication method described above, the voice data may be speech recognized divisionally for each predetermined number of words to convert the voice data into character data. In this instance, the voice data may be speech recognized divisionally for each phrase to covert the voice data into character data.

Alternatively, in the communication method described above, in parallel to the speech recognition, the speech data may be compressed in units of a predetermined number of words to produce compression voice data, and when the speech recognition is insufficient or results in failure, the compression voice data may be sent out as packets.

As another alternative, the communication method may be constructed such that a voice profile which represents a characteristic of voice inputted to the call originating side terminal is transmitted in advance from the call originating side terminal to the call terminating side terminal, and upon speech synthesis by the call terminating side terminal, the character data are converted into voice data based on the voice profile, or else such that a speech synthesis standard pattern for standard voice is prepared by both of the call originating side terminal and the call terminating side terminal, and the call originating side terminal produces finite difference data of voice inputted to the call originating side terminal from the standard voice and sends out the finite difference data together with the packet character data whereas the call terminating side terminal synthesizes voice based on the speech synthesis standard pattern and the finite difference data.

As a further alternative, the communication method may be constructed such that the call originating side terminal sends out background sound source data corresponding to background sound together with the packet character data whereas the call terminating side terminal outputs the voice data and background sound in a superposed relationship with each other, or such that sample voice data are prepared in advance in the call originating side terminal, and when voice of the talking person is inputted first to the call originating side terminal, the voice data and the sample voice data are compared with each other to discriminate whether or not the voice data and the sample voice data originate from the same talking person, and then only when it is discriminated that the voice data and the sample voice data originate from the same talking person, transmission is permitted. The communication method may otherwise be constructed such that the call originating side terminal produces image data obtained by imaging the talking person and sends out the image data to the call terminating side terminal, and the call terminating side terminal displays an image based on the received image data. Or else, the call terminating side terminal may display the received packet character data in the form of characters, or the call terminating side terminal may convert the received packet character data into an electronic mail.

In summary, in the communication method described above, deterioration in voice, unnatural interruption of language, jump of voice and so forth which arise from unstable communication or a variation in load in a communication method which is performed through a non-guarantee type network can be eliminated to the utmost to allow natural conversation which can be interpreted readily.

According to another aspect of the present invention, there is provided a voice transmission apparatus, comprising voice inputting means for converting voice of a talking person into electric voice data, speech recognition means for speech recognizing the voice data to convert the voice data into character data, identification data inputting means for inputting identification data for identification of a particular communication object party on a non-guarantee type network, network connection means for connecting the voice transmission apparatus to the particular communication object party based on the identification data through the non-guarantee type network, and transmission means for sending out the character data as packets to the non-guarantee type network.

The voice transmission apparatus may be constructed such that the speech recognition means converts, if, upon recognition of the voice to convert the voice into character data, the conversion into character data results in success, the character data, whose conversion has resulted in success, into packets, but if the recognition results in failure, the speech recognition compression codes the voice data, whose recognition has resulted in failure, and converts the compression coded voice data into packets.

According to a further aspect of the present invention, there is provided a voice reception apparatus, comprising network connection means for connecting the voice reception apparatus to a non-guarantee type network based on an identification signal which specifies the voice reception apparatus, reception means for receiving character data in the form of packets from the non-guarantee type network, speech synthesis conversion means for converting the received packet character data into voice data by speech synthesis, and voice outputting means for outputting voice based on the voice data obtained by the conversion.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a block diagram of another communication system to which the communication method according to the resent invention is applied;

FIGS. 5(a) and 5(b) are flow diagrams illustrating operation of the communication system shown in FIG. 2.

DESCRIPTION OF THE PREFERRED EMBODIMENTS

Figure 1A:
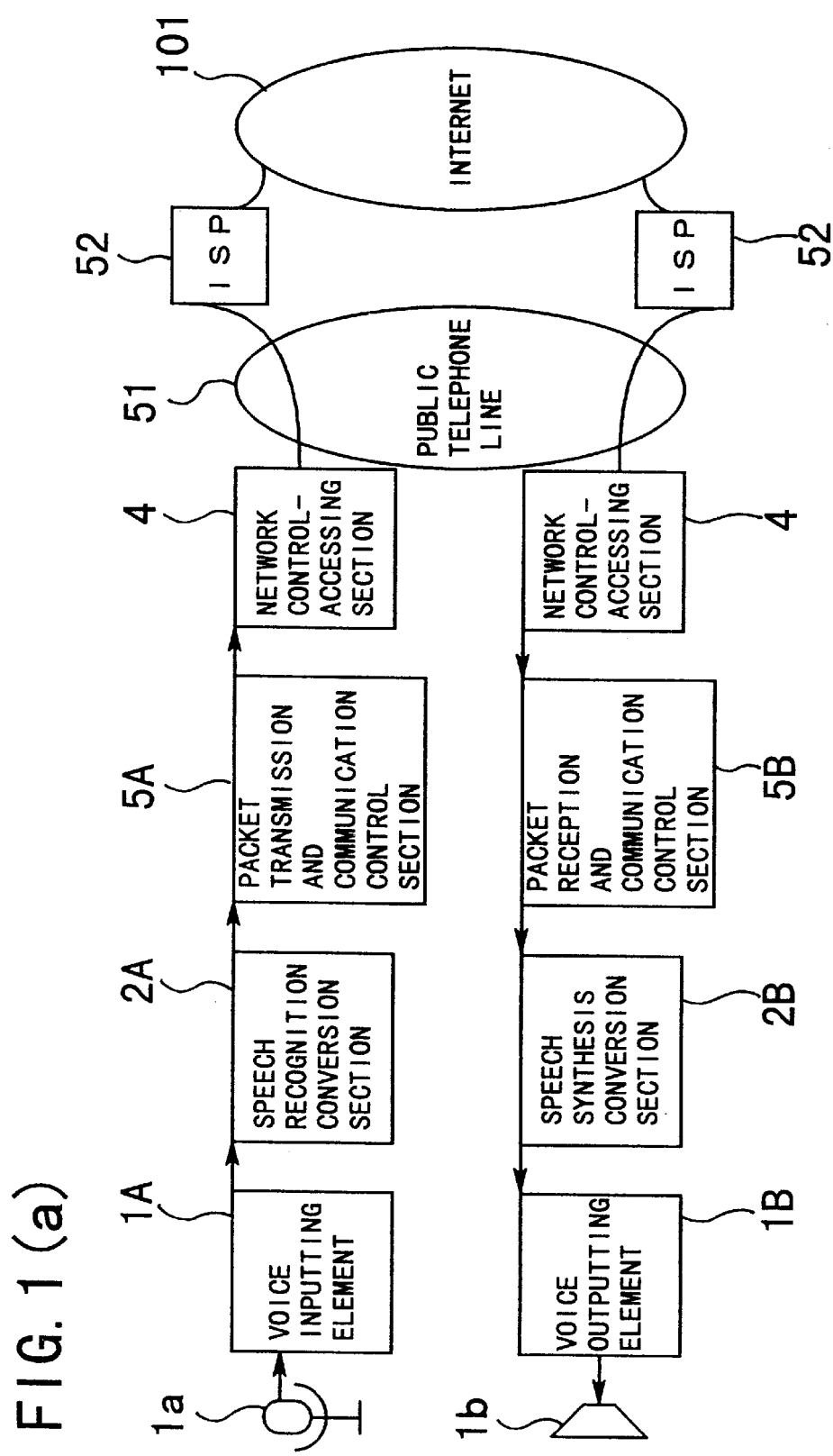
FIGS. 1(a) is a block diagram of a communication system to which a communication method according to the present invention is applied.

Referring first to FIG. 1(a), there are shown a communication system including a voice transmission apparatus and a voice reception apparatus to which a communication method according to the present invention is applied. In the transmission side terminal or voice transmission apparatus, voice of a talking person is inputted through a voice to electric conversion element such as a microphone 1a to a voice inputting element 1A, by which the voice signal is converted into a corresponding voice data electric signal. The voice data is inputted to a speech recognition conversion section 2A, by which it is converted into a character code data signal using speech recognition. A network control-accessing section 4 formed from, for example, a modem or a terminal adapter is connected to an internet 101 through a public telephone line 51 and an internet service provider 52. After the network control-accessing section 4 establishes connection to the network control-accessing section 4 of a receiving side terminal of the other party of communication based on the Internet protocol, it enters communication in which speech recognition is used. In this instance, the transmission side terminal knows an identification number, generally an IP (Internet Protocol) address, of the reception side terminal in advance, and establishes connection to the reception side terminal using the IP address.

After the establishment of connection to the reception side terminal, a packet transmission and communication control section 5a partitions the character code data signal for each suitable length to form packets, adds the IP address, a data number and so forth to the packet data and transmits the resulting packets to the reception side terminal through the network control-accessing section 4. In the reception side terminal or voice reception apparatus, the received packet data are demodulated into a character code data signal by a packet reception and communication control section 5b and then converted into a voice data signal by speech synthesis by a speech synthesis conversion section 2B. Then, a voice outputting element 1B outputs the voice data signal as voice by means of an electric to voice conversion element such as a speaker 1b.

Figure 1B:
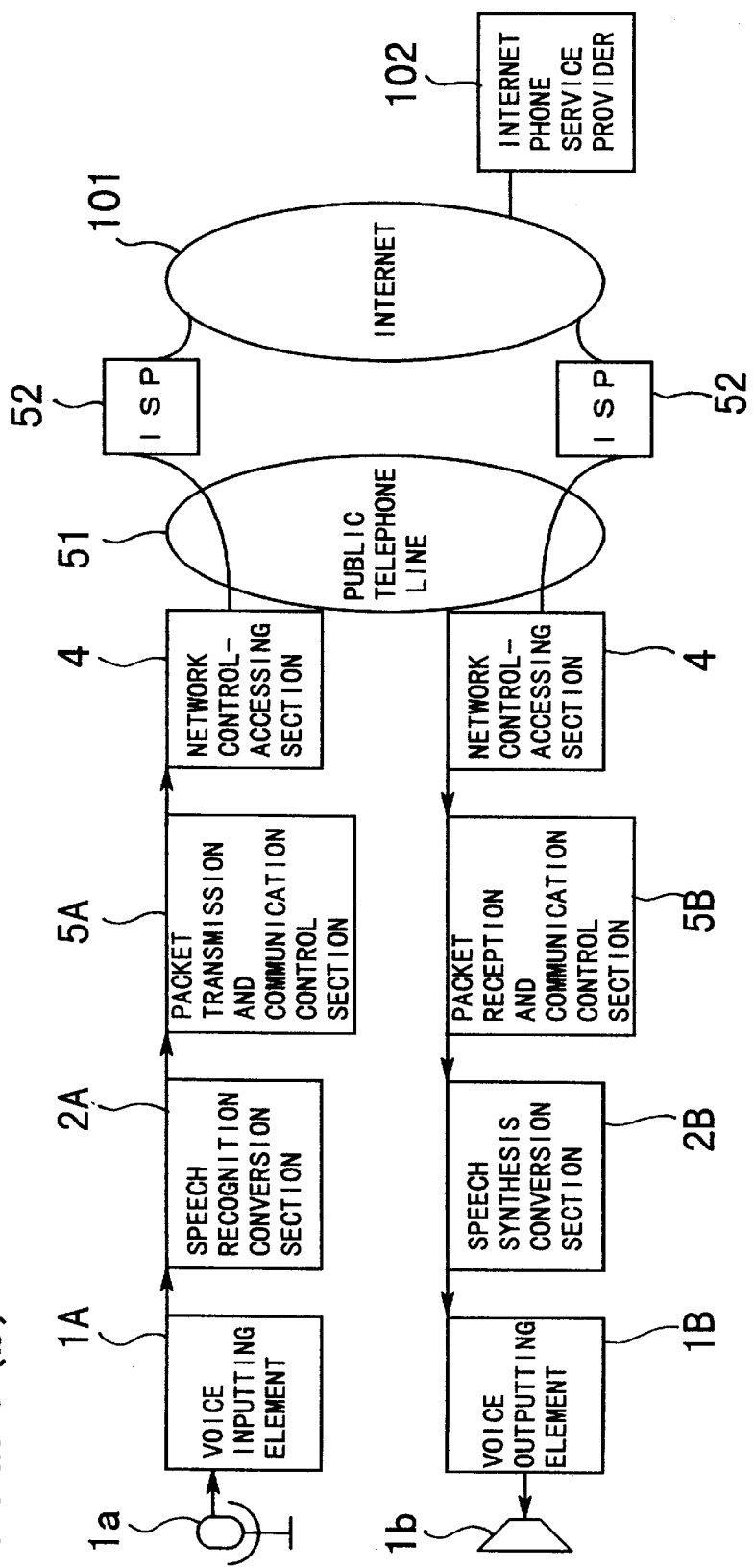
FIG. 1(b) is a similar view but showing a modified communication system.

FIG. 1(b) shows in block diagram a modification to the communication system to which the communication method according to the present invention is applied.

Referring to FIG. 1(b), in the modified system shown, in a condition wherein the transmission side terminal and the reception side terminal are connected to an internet phone service provider 102 in the internet 101, an identification number sent out from the transmission side terminal is received by the internet phone service provider 102, and then the internet phone service provider 102 executes a connection process to the reception side terminal, whereafter communication based on speech recognition is started between the terminals.

This connection is applied to a case wherein the other party terminal does not have a fixed identification number (IP address) in such a case that the other party terminal is connected to the internet service provider 52 by dial up connection. In this instance, if identification ID information necessary for connection such as telephone numbers or mail addresses of the transmission and reception side terminals are registered in advance in the Internet phone service provider 102 and the transmission side terminal inputs the identification ID information of the reception side terminal, then the internet phone service provider 102 originates, based on the identification ID information, a call to the reception side terminal through an accessing device such as a modem or a terminal adapter to establish connection to the reception side terminal. Or, also where the two terminals are connected to the internet phone service provider 102 simultaneously, establishment of connection is possible.

The systems shown in FIGS. 1(a) and 1(b) can be constructed in a type wherein a communication apparatus is added to or combined with a processing apparatus such as a personal computer (PC) or another type wherein a processing section and a communication section are formed as a unitary member or in a further type wherein characteristics of the two types are combined.

FIG. 2 shows in block diagram a communication system including a voice transmission apparatus and a voice reception apparatus to which the communication method according to the present invention is applied. Referring to FIG. 2, each of a transmission side terminal 20a and a reception side terminal 20b includes a voice inputting and outputting element (voice inputting means and voice outputting means) 1 having a microphone 1a and a speaker 1b built therein, a speech recognition and synthesis conversion section (speech recognition means and speech synthesis conversion means) 2 for recognizing voice data from the voice inputting and outputting element 1 by speech recognition and converting the voice data into character code data, a communication control section (transmission means and reception means) 3 for controlling an entire communication control procedure, a network control apparatus (network connection means) 4, a modem 5, an inputting operation section 6 for inputting various data therethrough, and a voice or data storage and display section 7.

Figure 3:
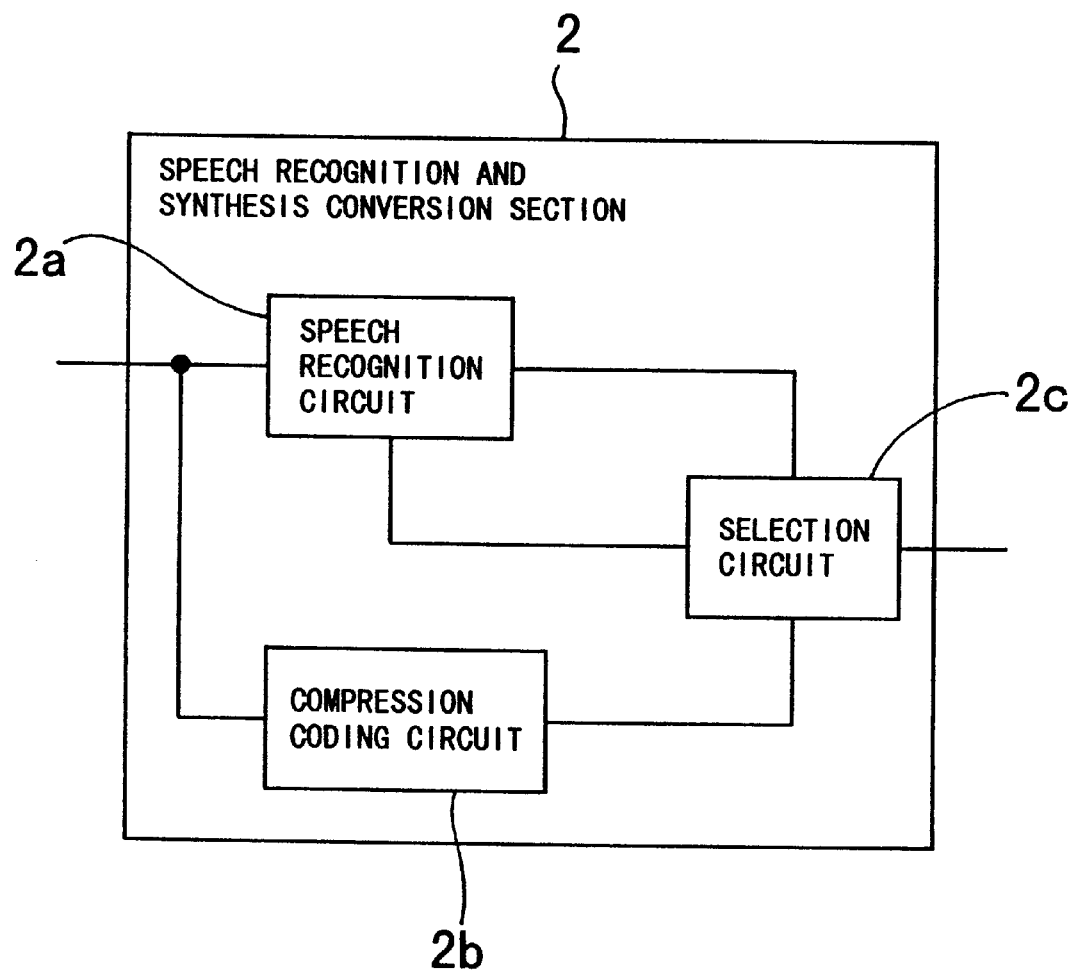
FIG. 3 is a block diagram of a speech recognition-synthesis conversion section of the communication system of FIG. 2.

Referring now to FIG. 3, the speech recognition and synthesis conversion section 2 includes a speech recognition circuit 2a, a compression coding circuit 2b, and a selection circuit 2c. The speech recognition circuit 2a compares speech recognized voice data with terms of a registration dictionary stored in advance therein to recognize the voice data in units of a phrase (group of words which may include a single word) like "hello", and outputs a result of the recognition as character codes to the selection circuit 2c. Also a signal representative of whether or not the recognition results in success or failure (the recognition result is not any one of voices registered in the registration dictionary) is outputted to the selection circuit 2c. The compression coding circuit 2b compression codes the voice signal and outputs resulting codes to the selection circuit 2c. The selection circuit 2c normally selects the output of the speech recognition circuit 2a, but if a signal representing that the recognition results in failure is received, then the selection circuit 2c selects the output of the compression coding circuit 2b.

Based on the identification number of the reception side terminal 20b inputted from the inputting operation section 6 of the transmission side terminal 20a, the transmission side terminal 20a is connected to an internet 101 through a telephone line 51 and an internet service provider (ISP) 52.

Then, by a similar procedure, the transmission side terminal 20a establishes connection to the reception side terminal 20b connected to the Internet 101 based on the internet protocol. Then, upon transmission of voice, the voice is recognized and converted into character codes by the speech recognition and synthesis conversion section 2, and the character codes are converted into packets and the IP address is added to the packets, whereafter the packets are sent to the reception side terminal 20b by a TCP/IP. The reception side terminal 20b converts the character codes into voice by speech synthesis to convey the voice to the other party. On the other hand, upon reception of voice, packet data sent from the other party terminal 20b are successively synthesized into voice by the transmission side terminal 20a. Consequently, the talking persons can talk in continuous sentences with each other.

Operation of the communication system having the construction described above is described in detail with reference to FIG. 2. The voice inputting and outputting element 1 of the transmission side terminal 20a first converts voice inputted from the microphone 1a from an analog signal into a digital signal and sends the digital signal to the speech recognition and synthesis conversion section 2. The speech recognition and synthesis conversion section 2 converts the input voice into character codes using the voice pattern and the registration dictionary. After the inputting is completed, the communication control section 3 immediately converts the character codes into packets, adds the IP address to the packets and transfers the resulting packets to the other party terminal through the modem 5 and network control-accessing section 4 of the transmission side terminal 20a and the communication line.

Here, the voice is divided for individual words and thus identified contents are sent to the other party terminal after a minimum delay. However, since the identified contents are conveyed to the other party through the internet service provider 52 and the internet 101 connected to each other, they arrive at the other party after a delay of one breath because of an influence of such a delay time of the network.

It is to be noted that the speech recognition and synthesis conversion section 2 shown in FIG. 2 has not only the voice text conversion function but also functions of format conversion, compression coding and so forth.

Figure 4:
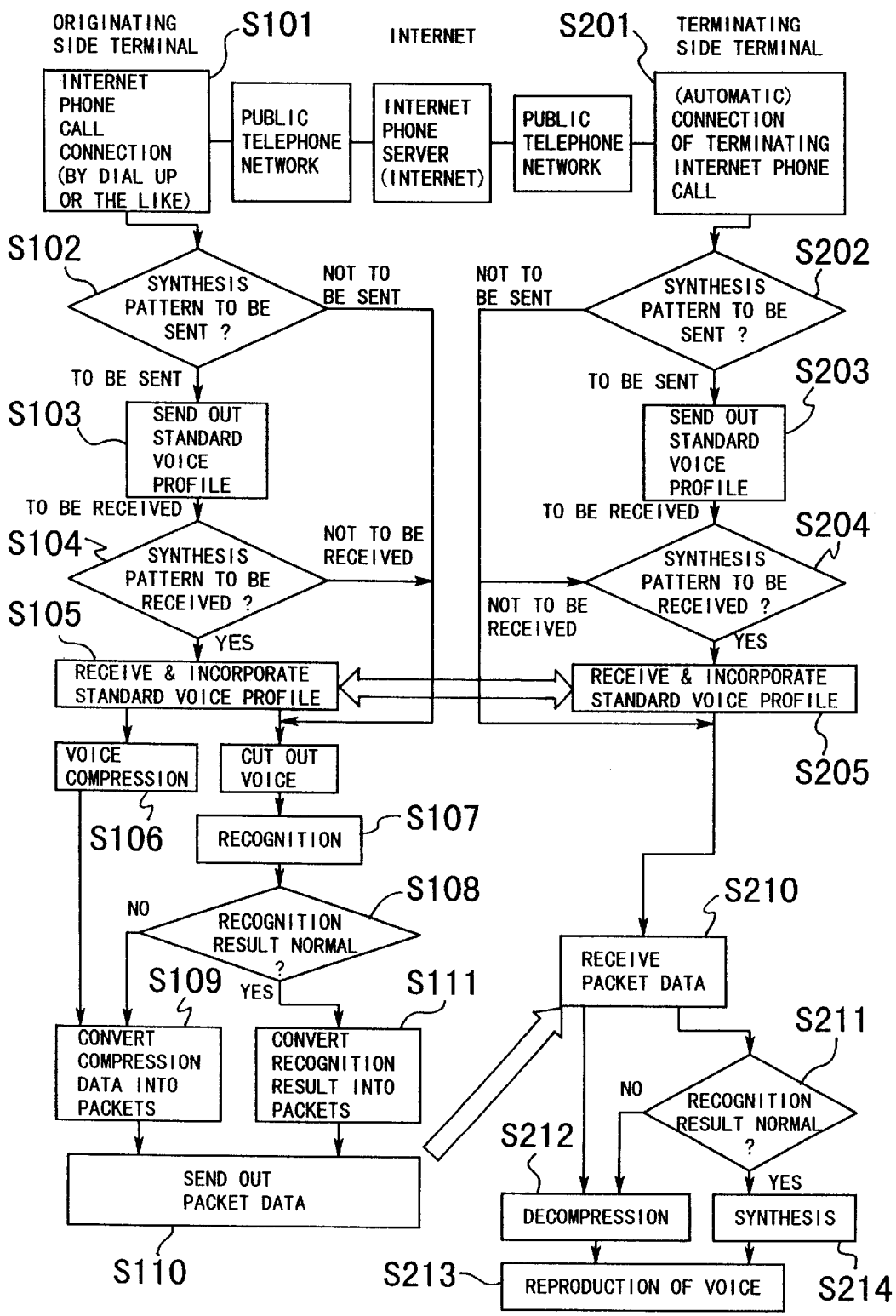
FIG. 4 is a flow chart illustrating operation of the communication system shown in FIG. 2.

FIG. 4 illustrates, in flow chart, detailed operation of the voice transmission apparatus and the voice reception apparatus of the communication system shown in FIG. 2.

Referring to FIG. 4, internet call connection from the call originating side (transmission side) terminal 20a by dial up or the like to the call terminating side (reception side) terminal 20b is performed.

In the internet call connection, the network control section 4 of the call originating side terminal 20a logs on to the internet service provider 52 through the public telephone line 51 and connects to the internet 101.

Then, the internet phone service provider 102 is connected from the communication control section 3 through the network control section 4 and the modem 5, and an identification number of the other party to be connected, that is, the call terminating side terminal 20b, is sent out.

The internet phone server 102 has a table for conversion between identification numbers and the other party IP addresses and sends a request for connection to the call terminating side terminal 20b making use of the IP address of the call terminating side terminal 20b detected from the table. It is assumed that either the call terminating side terminal 20b logs on to the internet 101 by dial up or the like in advance under the control of the internet phone service provider 102 and connects to the internet phone service provider 102 or the internet phone service provider 102 performs telephone connection through an access point nearest to the call terminating side terminal 20b and the call terminating side terminal 20b completes its telephone call connection and internet network connection by automatic response or the like.

The internet call connection is performed by a method wherein it is performed by intervention of such a mechanism which effects re-reading between an IP address and an individual name such as the internet phone service provider 102 as described above or another method wherein the other party has a fixed IP address and the call origination side knows the IP address in advance and sends out the IP address.

The procedure described above is executed in steps S101 and S201 of FIG. 4.

After completion of the internet call connection, conversation is performed in a procedure described below.

Conversation with the other party is performed using the speech recognition and compression and decompression functions of the speech recognition and synthesis conversion section 2 of the terminals 20a and 20b. In this instance, speech recognition is performed principally, and the compression and decompression functions are used preparatorily.

Prior to conversation, the communication control section 3 of the call originating side terminal 20a confirms by a protocol with the call terminating side terminal 20b whether or not data and a voice profile for allowing, upon speech synthesis and reproduction of the other party side, reproduction with a tone near to the pronunciation of the call originating party should be sent out. If a result of the confirmation reveals that "to be sent" has been selected, the a standard voice profile of the call originating side terminal 20a, or particularly when it is desired to change the tone, a voice profile designated particularly, is sent out to the other party terminal 20b. Similarly, confirmation of transmission of a voice profile is performed also from the call terminating side terminal 20b, and when "to be sent" is selected, a voice profile is sent from the call terminating side terminal 20b and is received by the call originating side terminal 20a. The voice profiles thus sent are subject to incorporation operation by both of the call terminating and originating sides. A voice profile includes rules (for example, voice of a man or a woman) to be used for conversion from characters into voice, which characterize a tone of a talking person, indicated by digital patterns of acoustic waves and is obtained by learning by the transmission side terminal 20a in advance. Therefore, if the character code data sent with such patterns incorporated therein are synthesized into voice by the speech recognition and synthesis conversion section 2 of the call terminating side terminal 20b, then reproduction voice close to the tone of the talking person is obtained.

The procedure described above is executed in steps S102 to S105 and S202 to S205 of FIG. 4.

Subsequently, a procedure of the transmission side terminal 20a in a stage after actual conversation is entered is described in connection with steps S106 to S110.

In the conversation, the following operations are repeated to convey language to the other party. In particular, uttered voice is subject to cutting out of voice data in units of a phrase, speech recognition and confirmation of success/failure of recognition by the speech recognition circuit 2a of the speech recognition and synthesis conversion section 2. If the confirmation proves success, then the character code data after the recognition are sent as packet data to the call terminating side terminal 20b through the selection circuit 2c. Since speech recognition does not exhibit a recognition rate of 100%, a case wherein recognition results in failure due to ambiguous pronunciation or by some other reason occurs at a certain rate. For preparations for a case of failure, also compression data cut out at the same position as that in the speech recognition are produced parallelly by the compression coding circuit 2b, and if the speech recognition results in failure, then the data part with which the recognition has resulted in failure is filled not with the recognized data but with the compression data.

"Cutting out" of voice is normally performed in units of an ordinary phrase, In particular, voice is successively recognized in units like "Hello", "I am" or the like.

Then, the speech recognition circuit 2a compares the uttered voice with the registration dictionary and adopts a pattern having a comparatively high similarity. Since any data with which no similar word has been found as a result of the comparison is either a new word or an unrecognizable word, the voice compression data produced by the compression coding circuit 2b is used to fill by the selection circuit 2c.

Subsequently, a procedure of the call terminating side terminal 20b in a stage after actual conversation is entered is described in connection with steps S210 to S214.

The call terminating side terminal 20b checks packet data sent thereto from the call originating side terminal 20a. If the packet data are data of the text type, that Is, character code data, then the speech recognition and synthesis conversion section 2 converts them into voice data using voice patterns based on the voice profiles incorporated already therein and sends out the voice data to the voice inputting and outputting element 1 which includes the speaker 1b. On the other hand, if the packet data are compression data, then the speech recognition and synthesis conversion section 2 converts the compression data into voice data corresponding to the input voice using the decompression function thereof and sends out the voice data to the voice inputting and outputting element 1.

Subsequently, in what manner talked language is reproduced by the reception side apparatus is described with reference to FIGS. 5(a) and 5(b) which are time charts illustrating the relationships in time of data processing.

Where the talked language is, for example, "Hello! This is Tanaka. Please call Tashiro.", it is divided into four phrases of "Hello", "This is Tanaka", "Please call" and "Mr. Tashiro". Thus, the phrases are successively recognized and sent out as text data so that they are transmitted to the reception side through a transmission line such as an internet, a LAN or the like. On the reception side, the received signal is successively synthesized into voice data, and the voice data are conveyed as voice to the receiving person through a voice outputting apparatus.

Figure 5B:
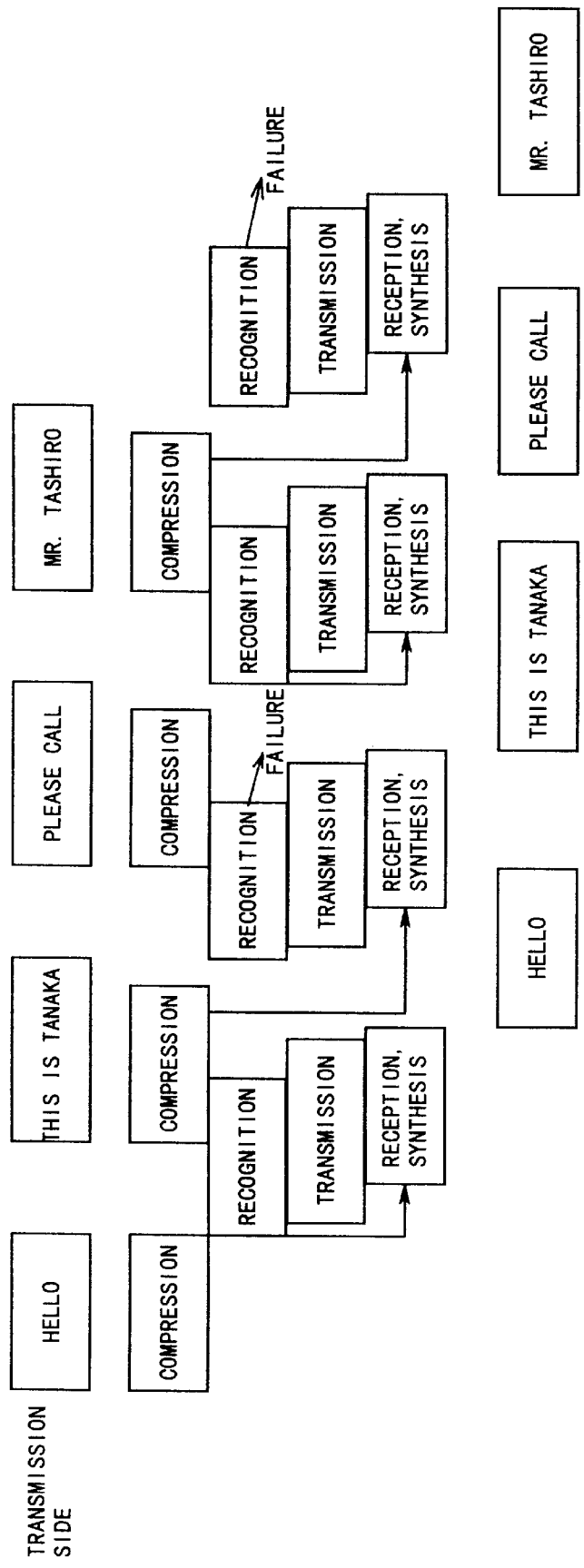
Figure 6A:
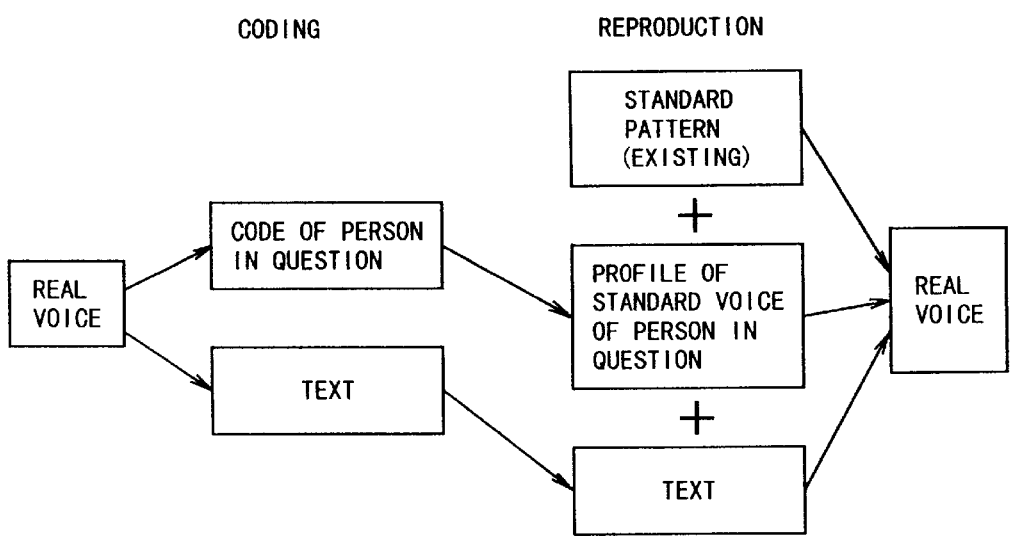
FIGS. 6(a) and 6(b) are flow diagrams illustrating different data transmission procedures of the communication system shown in FIG. 2.
Figure 6B:
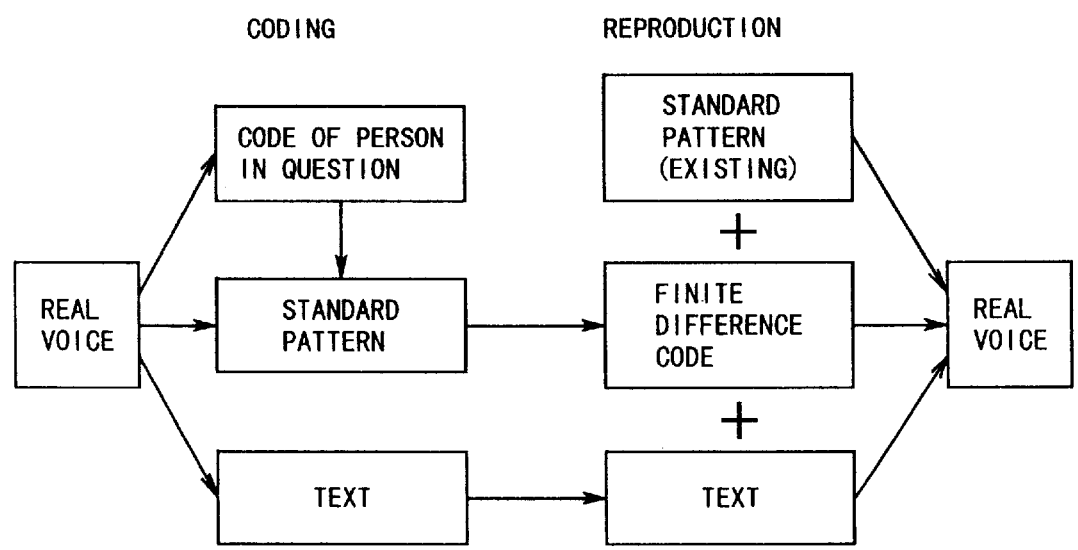

If the language is normal as seen in FIG. 5(a), reproduction of voice is performed in the procedure described above. However, if the language includes some word which cannot be recognized correctly and recognition of the same results in failure as seen in FIG. 5(b), then pertaining compression data produced in parallel to the recognition is sent out in place of the text data to the receiving terminal. The receiving terminal thus performs processing of decompression of the compression data and reproduces the word obtained by the decompression processing in a correct sequential order together with other words obtained by speech synthesis.

Since the communication method employed in the communication system shown in FIG. 2 is constructed in such a manner as described above, the following advantages can be achieved.

In particular, since significance is interpreted for each phrase of talked language and the language is converted into character data which is data of a form which exhibits a very small amount of data, a possible delay in communication can be minimized, and the language is reproduced not as a train of mere sounds but as clearly significant words. Therefore, deterioration in voice, unnatural interruption of words, jump of voice and so forth which arise from unstable communication or a variation in load can be eliminated to the utmost to allow natural conversation which can be interpreted readily.

Further, the complex function of speech recognition to which the compression function is added can solve problems of the recognition performance and the reliability, which arise from ambiguous input voice, involved in conventionally available speech recognition, and application of the complex function to apparatus to be put on the market can be realized readily.

Further, since language can be stored and transmitted as characters, the communication method can be applied to storage of calls, transfer of mails, broadcasting transmission and combination with images in accordance with characteristics of various networks such as an internet.

Naturally, the fact that the total amount of data to be transmitted is small has a reduced influence on the capacity of an internet service provider and allows utilization of the communication method over a wide range, and besides exhibits a social effect that the internet traffic is reduced to increase the width of utilization of the entire network.

The communication method and the communication system described above with reference to FIG. 2 may be modified such that the communication system operates alternatively in the following manner. In particular, in the modified system, in the stage of internet call connection in step S101 and S201 of FIG. 4, the waveform of uttered voice of representative language such as "Hello", which is uttered first, is analyzed by the speech recognition and synthesis conversion section 2, and then the waveform is compared with voice patterns of the person in question registered in advance to confirm that the uttered voice originates from the person in question. Then, only when it is confirmed that the uttered voice originates from the person in question, succeeding communication is enabled, or based on a result of confirmation, a registered voice pattern is automatically selected and sent out to the other party. Also various services including a service which allows accessing to various services other than talking can be performed based on a result of confirmation by the speech recognition and synthesis conversion section 2.

The communication method and the communication system described above with reference to FIG. 2 may be modified otherwise such that the communication system operates in the following manner. In particular, in the communication system described hereinabove with reference to FIG. 1(a), upon speech synthesis, a dictionary (voice profile) in which characteristics of the person in question are registered is sent out in advance and a reference dictionary is tuned in accordance with voice of the person in question so that voice is reproduced in a form near to the voice of the person in question. Thus, in the modified system, an incorporated standard dictionary is used as the reference dictionary, and finite difference data from the standard pattern upon production of character codes are sent out additionally while an algorithm for causing data of individual phrases to approach the tone of the person in question. Consequently, sending out of first voice patterns can be omitted.

The communication method and the communication system described above with reference to FIG. 2 may be modified further otherwise such that the communication system operates in the following manner. In the modified system, a background sound source separate from a voice profile described above is sent additionally together with character data so that background sound can be reproduced upon synthesis into conversation. In particular, in the apparatus described with reference to FIG. 1(a), since principally data after speech recognition are transmitted, when voice is reproduced by the reception side terminal 20b, background sound such as sound in the external world which enters the phone is little reproduced. Where such a situation as just described is considered unnatural, or in accordance with the taste of the talking person, a sound source code regarding background sound is transmitted, and the background sound and voice of the talking person are reproduced in a superposed relationship on each other. Or, music, sound of a tram car or the like may be sent out as a background sound source code. The foregoing can be realized by adding the function described above to the speech recognition and synthesis conversion section 2 of FIG. 2.

The communication method and the communication system described above with reference to FIG. 2 may be modified furthermore otherwise such that character data can be outputted directly from the speech recognition and synthesis conversion section 2 and displayed on the data storage and display section 7. Further, as one of functions of the communication control section 3, the data storage and display section 7 may have a response-storage function such that, when the talking person on the reception side is absent and cannot respond, the communication control section 3 automatically responds and produces voice mail data using the voice of the other party side and voice profile data of the person in question and stores the voice mail data into the data storage and display section 7. Or, character data may be stored in the form of an electronic mail. Further, the data storage and response function may be utilized such that, when the reception side talking person is absent and cannot respond, the communication control section 3 is used to transfer character data as an electronic mail or, when necessary, as a voice mail with voice profile data added thereto to a location where the user of the terminal is present.

The communication method and the communication system described above with reference to FIG. 2 may be modified also such that a camera and image processing and displaying software are added as functions of the data storage and display section 7 and video data of the face or the like of the talking person is transferred so that an image may be displayed on a display unit of the reception side together with utterance of voice.

Having now fully described the invention, it will be apparent to one of ordinary skill in the art that many changes and modifications can be made thereto without departing from the spirit and scope of the invention as set forth herein.

What is claimed is:

1. A communication method for communicating voice of a talking person through a non-guarantee type network, comprising the steps of:

converting, by a call originating side terminal, voice of a talking person into voice data and speech recognizing the voice data to convert the voice data into character data;

connecting the call originating side terminal to a call terminating side terminal through the non-guarantee type network based on identification data of the call terminating side terminal;

transmitting, after the connection between the call originating side terminal and the call terminating side terminal is established, the character data as packets toward the call terminating side terminal; and receiving the packet character data by the call terminating side terminal, converting the received character data in the form of packets into voice data by speech synthesis and outputting the voice data as voice;

wherein the voice data are speech recognized divisionally for each predetermined number of words to convert the voice data into character data; and wherein, in parallel to the speech recognition, the voice data are compressed in units of a predetermined number of words to produce compression voice data, and when the speech recognition is insufficient or results in failure, the compression voice data are sent out as packets.

2. A communication method as claimed in claim 1, wherein a voice profile which represents a characteristic of voice inputted to the call originating side terminal is transmitted in advance from the call originating side terminal to the call terminating side terminal, and upon speech synthesis by the call terminating side terminal, the character data are converted into voice data based on the voice profile.

3. A communication method as claimed in claim 1, wherein a speech synthesis standard pattern for standard voice is prepared by both of the call originating side terminal and the call terminating side terminal, and the call originating side terminal produces finite difference data of voice inputted to the call originating side terminal from the standard voice and sends out the finite difference data together with the packet character data whereas the call terminating side terminal synthesizes voice based on the speech synthesis standard pattern and the finite difference data.

4. A communication method as claimed in claim 1, wherein the call originating side terminal sends out background sound source data corresponding to background sound together with the packet character data whereas the call terminating side terminal outputs the voice data and background sound in a superposed relationship with each other.

5. A communication method as claimed in claim 1, wherein sample voice data are prepared in advance in the call originating side terminal, and when voice of the talking person is inputted first to the call originating side terminal, the voice data and the sample voice data are compared with each other to discriminate whether or not the voice data and the sample voice data originate from the same talking person, and then only when it is discriminated that the voice data and the sample voice data originate from the same talking person, transmission is permitted.

6. A communication method as claimed in claim 1, wherein the call originating side terminal produces image data obtained by imaging the talking person and sends out the image data to the call terminating side terminal, and the call terminating side terminal displays an image based on the received image data.

7. A communication method as claimed in claim 1, wherein the call terminating side terminal displays the received packet character data in the form of characters.

8. A communication method as claimed in claim 1, wherein the call terminating side terminal converts the received packet character data into an electronic mail.

9. A communication apparatus, comprising:

a voice transmission apparatus, comprising:

voice inputting means for converting for converting voice of a talking person into voice data;

speech recognition means for speech recognizing the voice data to convert the voice data into character data;

identification data inputting means for inputting identification data for identification of a particular communication object party on a non-guarantee type network;

network connection means for connecting said voice transmission apparatus to the particular communication object party based on the identification data through said non-guarantee type network; and transmission means for sending out the character data as packets to said non-guarantee type network;

wherein, upon successful recognition of the voice for converting the voice into character data, said speech recognition means converts the character data into packets, but upon unsuccessful recognition, said speech recognition means compresses the voice data and converts the compressed voice data into packets.

10. The communication apparatus of claim 9, further comprising:

a voice reception apparatus, comprising:

network connection means for connecting said voice reception apparatus to a non-guarantee type network based on an identification signal which specifies said voice reception apparatus;

reception means for receiving character data in the form of packets from said non-guarantee type network;

speech synthesis conversion means for converting the received packet character data into voice data by speech synthesis; and voice outputting means for outputting voice based on the voice data obtained by the conversion.

* * * * *